United States Patent [19]
Debaigt

[11] 4,268,108
[45] May 19, 1981

[54] LOCKING ARRANGEMENT FOR FIXING A TERMINAL BLOCK

[75] Inventor: Jean Debaigt, Maisons Laffitte, France

[73] Assignee: CGEE Alsthom, Levallois-Perret, France

[21] Appl. No.: 89,393

[22] Filed: Oct. 30, 1979

[30] Foreign Application Priority Data

Nov. 6, 1978 [FR] France .............................. 78 31308

[51] Int. Cl.³ .............................................. H01R 9/26
[52] U.S. Cl. .............................................. 339/198 GA
[58] Field of Search ........... 339/119 R, 198 R, 198 G, 339/198 GA, 198 H, 198 K; 174/158 R; 248/221.3, 221.4, 222.1, 225.1, 226.1

[56] References Cited

U.S. PATENT DOCUMENTS

| 2,980,037 | 4/1961 | Elsner | 248/222.1 |
| 4,113,982 | 9/1978 | Glaesel | 339/198 GA |
| 4,157,858 | 6/1979 | Debaigt | 339/198 GA |

FOREIGN PATENT DOCUMENTS

| 1021052 | 12/1957 | Fed. Rep. of Germany ...... 339/198 GA |
| 1415689 | 10/1968 | Fed. Rep. of Germany . |
| 1803760 | 6/1970 | Fed. Rep. of Germany . |
| 2172827 | 10/1973 | France . |
| 2392576 | 12/1978 | France . |

Primary Examiner—John McQuade
Attorney, Agent, or Firm—Kenyon & Kenyon

[57] ABSTRACT

The locking arrangement relates to fixing a terminal block whose base (6) includes two fixing tabs (1,2) one of which is used in cooperation with a similar third tab (3) for fixing the block onto a supporting section bar with outwardly turned rims (51) and the other of which is used in cooperation with the third tab for fixing the block onto a supporting section bar with inwardly turned rims (52). Said tabs each have a fixing notch (11,21) for engaging one edge of a supporting section bar. The locking arrangement comprises a locking plate (7) slidable transversely with respect to the supporting section bars and having lock notches (81,91) disposed adjacent the fixing notches. A resilient member (61) is provided to allow one of said lock notches to engage under one of said rims. The invention applies in particular to producing connection strips.

8 Claims, 4 Drawing Figures

LOCKING ARRANGEMENT FOR FIXING A TERMINAL BLOCK

The invention relates to a locking arrangement for fixing a terminal block, and more particularly a terminal block suitable for installation on various types of supporting channels or section bars having parallel edges with either inwardly or outwardly turned rims.

French patent application No. 77 16278 published under the No. 2 392 576 describes such a terminal block, but when it has high-power terminals and is consequently used with stiff, heavy-gauge wires, the block is in danger of being subjected to transverse stresses which can impair the fixing thereof on the section bar which acts as its support. Therefore, it must be possible to lock the terminal block in position on the appropriate section bar which is to support it.

Preferred embodiments of the present invention provide a terminal block with a locking arrangement which meets these requirements.

The invention provides a locking arrangement for locking a terminal block to a supporting section bar, the terminal block having a base including fixing means for fixing to two different kinds of supporting bar, namely a first kind having outwardly turned rims and a second kind having inwardly turned rims; the fixing means including a first fixing tab for co-operating with an outwardly turned rim, a second fixing tab for co-operating with an inwardly turned rim, and a third fixing tab for co-operating with either kind of rim, such that the block is fixable to either kind of supporting bar by means of the third fixing tab and that one of the first and second fixing tabs which is appropriate to the kind of supporting bar in question, each fixing tab including a notch for receiving a rim of at least one kind of supporting bar and the fixing means as a whole including sufficient resilience for the block to be snap fitted to a supporting section bar; the locking arrangement comprising guide means and a locking plate disposed transversally with respect to a supporting section bar when fixed in the fixing means, and having lock notches arranged to reinforce the action of the notches in at least some of the tabs, the guide means being arranged to allow at least one of the lock notches to engage one of the rims of a supporting bar once the terminal block has been snap-fitted thereto.

Preferably the locking plate is slidably disposed in a transverse slot in the base of the terminal block and has an opening through which a pin is disposed parallel to the rims of the supporting section bar, said pin being supported by the base.

Two resilient locking positions may advantageously be provided for the locking plate, which may be engaged with a resilient tongue which is moulded under the base of the terminal block as a part thereof.

The plate may have a manipulator rod.

The lock notches can be made more efficient by providing re-entrant portions at their tips and easier to use by providing engagement ramps for camming over the edges of the section bars.

An embodiment of the invention is described by way of example with reference to the accompanying drawings in which.

Figure 1:
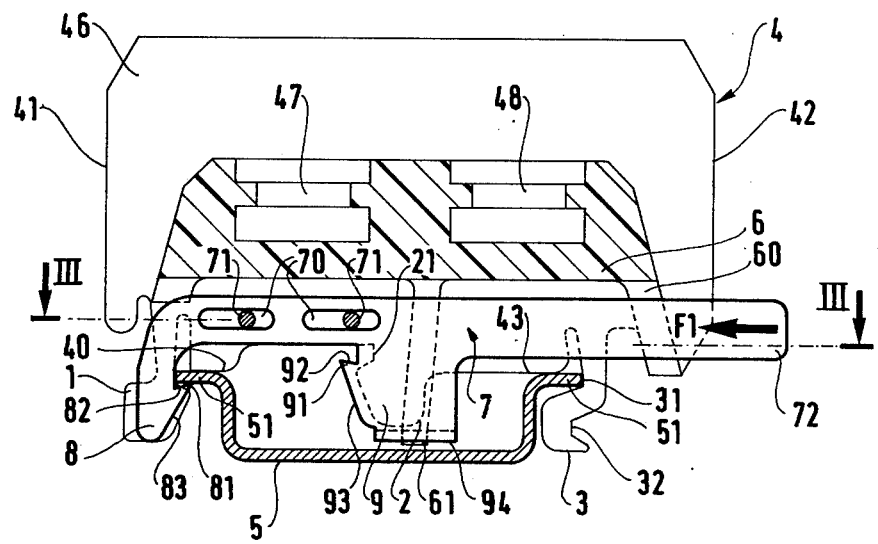
FIG. 1 is a schematic transverse cross-section of a terminal block in accordance with the invention, installed on a section bar with outwardly turned rims.

In the figures, 4 is an assembly formed by a terminal block with a left side 41, a right side 42, a front flange 45, a rear flange 46 and a base 6. The upper part of the terminal block has two recesses 47 and 48 in which terminals, not shown, are to be plugged. A transverse slot 60 crosses the base 6 from the left side 41 to the right side 42. On either side of the slot 60, the terminal block includes a fixing arrangement formed by a bearing flat 40, a bearing flat 43, a first fixing tab 1 disposed on the left side 41, a second fixing tab 2 disposed in the centre and a third fixing tab 3 disposed on the right side 42.

The first fixing tab 1 is a resilient tab which includes a resilient fixing notch 11 facing the flat 40 and offset from the level thereof substantially by the thickness of one outwardly turned rim 51 of a support channel or section bar 5.

The second fixing tab 2, which is rigid, likewise includes a fixing notch 21 facing the flat 40 and offset from the level thereof substantially by the thickness of one inwardly turned rim 52 of a support section bar 5'.

The third fixing tab 3 is resilient and includes a practically rigid fixing notch 31 facing the flat 43 and offset from the level thereof substantially by the thickness of the rim 51 and, at its free end, a fixing notch 32 pointing in the opposite direction to the fixing notch 21.

The flat 43 is disposed in the line of the flat 40 between the fixing tabs 2 and 3. A resilient tongue 61 moulded in one piece with the base 6 of the terminal block is disposed under the base between the slot 60 and the fixing tab 2 situated on the side nearest the flange 46 and can bend resiliently about a rest position either towards the left side 41 or towards the right side 42.

A locking plate 7 is inserted in the slot 60 and has two slots 70 which allow it to slide on pins 71 which pass through each slot 70 and are inserted in holes 62 between tabs 1 and 2 in the base 6.

At one end even with the tab 1, the plate 7 has a first protruding edge 8 with a lock notch 81 adjacent the fixing notches 11 and inclined towards the base by a re-entrant slope 82 and having an engagement ramp 83.

In its central portion even with the tab 2, the plate 7 has a second protruding edge 9 with a lock notch 91 facing the fixing notches 21 and inclined towards the base 6 by means of a re-entrant slope 92 and having an engagement ramp 93. The lower end of the protruding edge 9 has an L extension 94 which constitutes a manipulator lever and points towards the tab 2 on the side nearest the flange 46. The extension 94 has an opening 95 through which the end of the resilient tongue 61 passes. The other end of the plate 7, i.e. beyond the tabs 2, has an extension which constitutes a manipulator rod 72.

When the terminal block has been installed on one of the two kinds of section bar as described in French patent application No. 77 16278, the locking arrangement operates as follows. In the rest position, the resilient tongue is vertical and the pins are in the centres of the openings 70. When the terminal block is placed on the supporting section bar 5 with outwardly turned rims 51 shown in FIG. 1, the end of the left-hand rim 51 slides up along the inclined ramp 83. This slides the plate 7 in the direction of the arrow $F_1$ and resiliently deforms the tongue 61 which is urged by the opening 95 in the extension 94 until the end of the rim 51 engages in the lock notch 81 in the locking position where the plate 7 remains subjected to a resilient force from the tongue 61 directed in the opposite direction to the arrow $F_1$.

To unlock the plate 7, it is necessary merely to exert pressure on the rod 72 in the direction of the arrow $F_1$ to clear the notch 81 from the edge of the rim 51 and to return the resilient tongue 61 to the vertical position.

Figure 2:
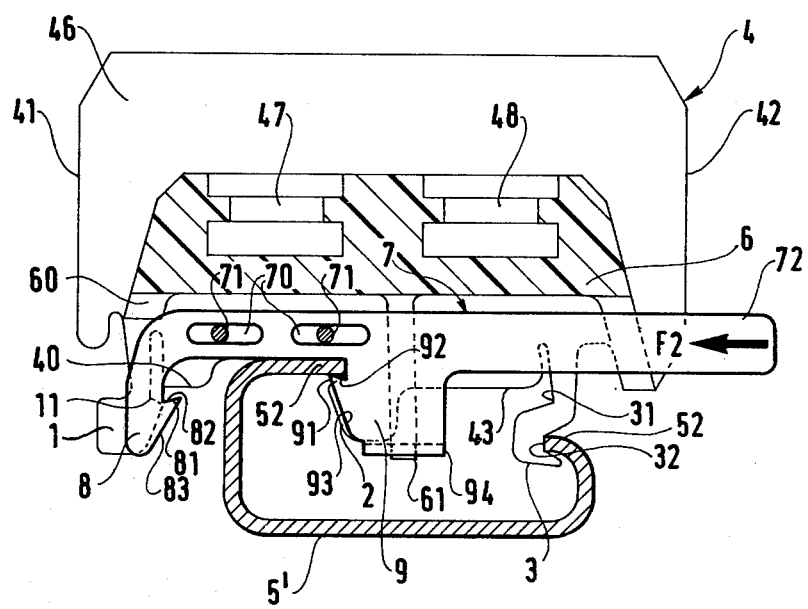
FIG. 2 is a schematic transverse cross-section of the terminal block of FIG. 1 installed on a section bar with inwardly turned rims.
Figure 3:
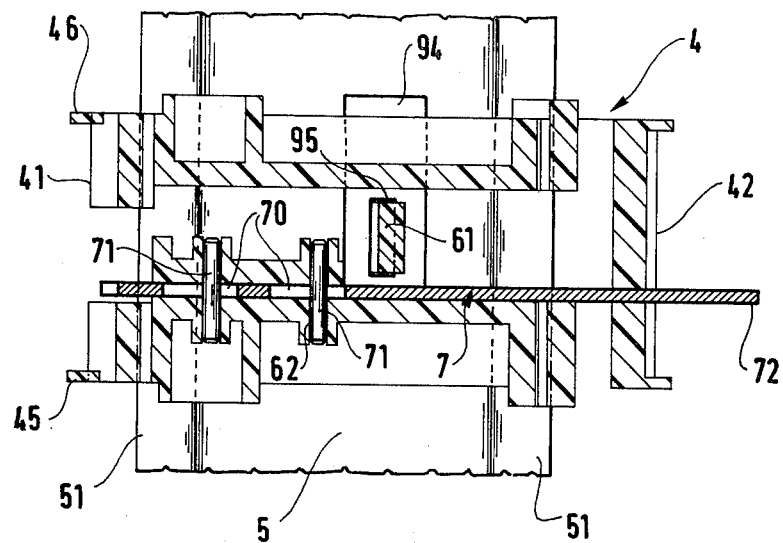
FIG. 3 is a cross-section through III—III of the base of the terminal block in FIG. 1.
Figure 4:
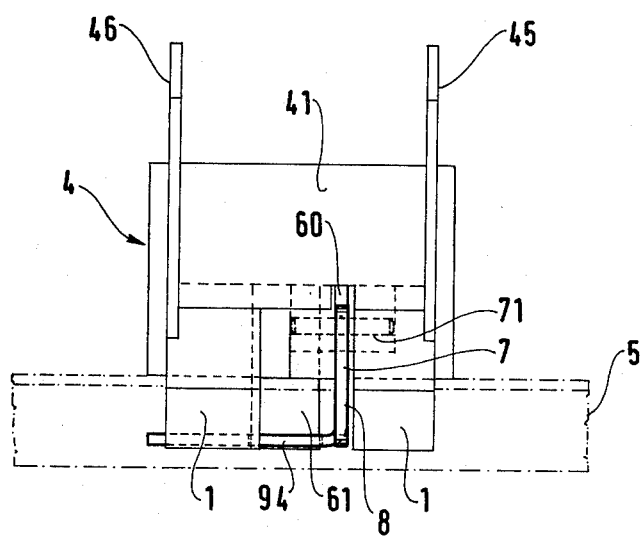
FIG. 4 is a left-side profile of the terminal block of FIG. 1.

When the junction block is being mounted on a support section bar 5' having inwardly turned rims 52 as shown in FIG. 2, the edge of the rim 52 is made to slide along the inclined slope 93 causing the plate 7 to slide in the opposite direction to the arrow $F_2$ and resiliently deforming the tongue 61 until the edge of the rim 52 is engaged in the lock notch 91 in the locking position, which position is maintained by the force exerted by the resilient tongue 61 on the plate 7 in the direction of the arrow $F_2$. To unlock the plate 7, it is necessary merely to exert pressure on the rod 72 in the opposite direction to the arrow $F_2$, thereby disengaging the notch 91 from the edge of the rim 52.

I claim:

1. A locking arrangement for locking a terminal block to a supporting channel section, the terminal block having a base including fixing means for fixing the terminal block to two different kinds of supporting channel, namely a first kind having outwardly turned rims and a second kind having inwardly turned rims; the fixing means including a first fixing tab for co-operating with an outwardly turned rim, a second fixing tab for co-operating with an inwardly turned rim, and a third fixing tab for co-operating with either kind of rim, such that the block is fixable to either kind of supporting channel by means of the third fixing tab and the appropriate one of the first and second fixing tabs for the kind of supporting channel in question, each fixing tab including a notch for receiving a rim of at least one kind of supporting channel, and the fixing means as a whole including sufficient resilience for the block to be snap fitted to a supporting channel wherein the locking arrangement comprises guide means on said terminal block and a locking plate disposed in said guide means for movement transversely with respect to a supporting channel section when said channel is fixed in the fixing means, said locking plate having lock notches arranged to reinforce the action of the notches in at least some of the tabs, the guide means being arranged to allow at least one of the lock notches to engage one of the rims of a supporting channel once the terminal block has been snap-fitted thereto.

2. An arrangement according to claim 1, wherein the guide means comprises a transverse slot in the base of the terminal block.

3. An arrangement according to claim 1, wherein the locking plate has an opening through which a pin is disposed parallel to the rims of the supporting channel section, said pin being supported by the base.

4. An arrangement according to claim 1, wherein the locking plate has a rest position and two locking positions corresponding respectively to the two different kinds of supporting channel, and the locking arrangement further comprises spring means disposed between the locking plate and the terminal block for resiliently urging the locking plate toward the rest position from either one of the locking positions.

5. An arrangement according to claim 4, wherein the spring means comprises a resilient tongue which is moulded integrally with the terminal block and which engages the locking plate.

6. An arrangement according to claim 1, wherein the locking plate has a manipulator rod for permitting manual unlocking of either one of the lock notches from a corresponding rim of a supporting channel.

7. An arrangement according to claim 1, wherein the lock notches in said locking plate are undercut such that they engage the rim of a corresponding supporting channel more tightly at their tips than at their roots.

8. An arrangement according to claim 1, wherein the locking plate includes engagement ramps leading to each lock notch.

* * * * *